US010932183B1

(12) United States Patent
Strong et al.

(10) Patent No.: US 10,932,183 B1
(45) Date of Patent: Feb. 23, 2021

(54) MESH NETWORK MANAGEMENT

(71) Applicant: Amazon Technologies, Inc., Seattle, WA (US)

(72) Inventors: Jas Strong, San Francisco, CA (US); Mete Rodoper, San Francisco, CA (US); Rowan Chakoumakos, San Francisco, CA (US); Ryan Thompson, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/438,936

(22) Filed: Jun. 12, 2019

Related U.S. Application Data

(60) Provisional application No. 62/684,608, filed on Jun. 13, 2018.

(51) Int. Cl.
*H04W 48/10* (2009.01)
*H04W 84/12* (2009.01)

(52) U.S. Cl.
CPC ............ *H04W 48/10* (2013.01); *H04W 84/12* (2013.01)

(58) Field of Classification Search
CPC ................................ H04W 48/10; H04W 84/12
See application file for complete search history.

(56) References Cited

U.S. PATENT DOCUMENTS

| | | | | |
|---|---|---|---|---|
| 2017/0006609 A1* | 1/2017 | Adachi | ............ | H04W 72/0453 |
| 2017/0359773 A1* | 12/2017 | Boodannavar | ........ | H04W 48/12 |
| 2018/0035292 A1* | 2/2018 | Soundararajan | ...... | H04W 12/06 |
| 2018/0234848 A1* | 8/2018 | Cohen | ................... | H04W 60/00 |
| 2019/0289539 A1* | 9/2019 | Lee | ..................... | H04W 40/246 |

* cited by examiner

*Primary Examiner* — Minjung Kim
(74) *Attorney, Agent, or Firm* — Lowenstein Sandler LLP

(57) ABSTRACT

Technology for selective feature announcement by an access point device in a network is described. In one embodiment, the access point device sends a wireless beacon to a plurality of client devices seeking to connect to the mesh network and receives a probe request message from a first client device of the plurality of client devices. The access point device determines, at least partially using information obtained from the probe request message and using other information not present in the probe request message, a category of the first client device and determines that the category of the first client device is incompatible with a certain feature offered by the access point device. The access point device sends a probe response message to the first client device omitting an indication of the certain feature, while the certain feature remains enabled for at least one other client device of the plurality of client devices.

14 Claims, 9 Drawing Sheets

MESH NETWORK MANAGEMENT

RELATED CASES

This application claims the benefit of U.S. Provisional Patent Application No. 62/684,608, filed Jun. 13, 2018, the entire contents of which are hereby incorporated by reference herein.

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
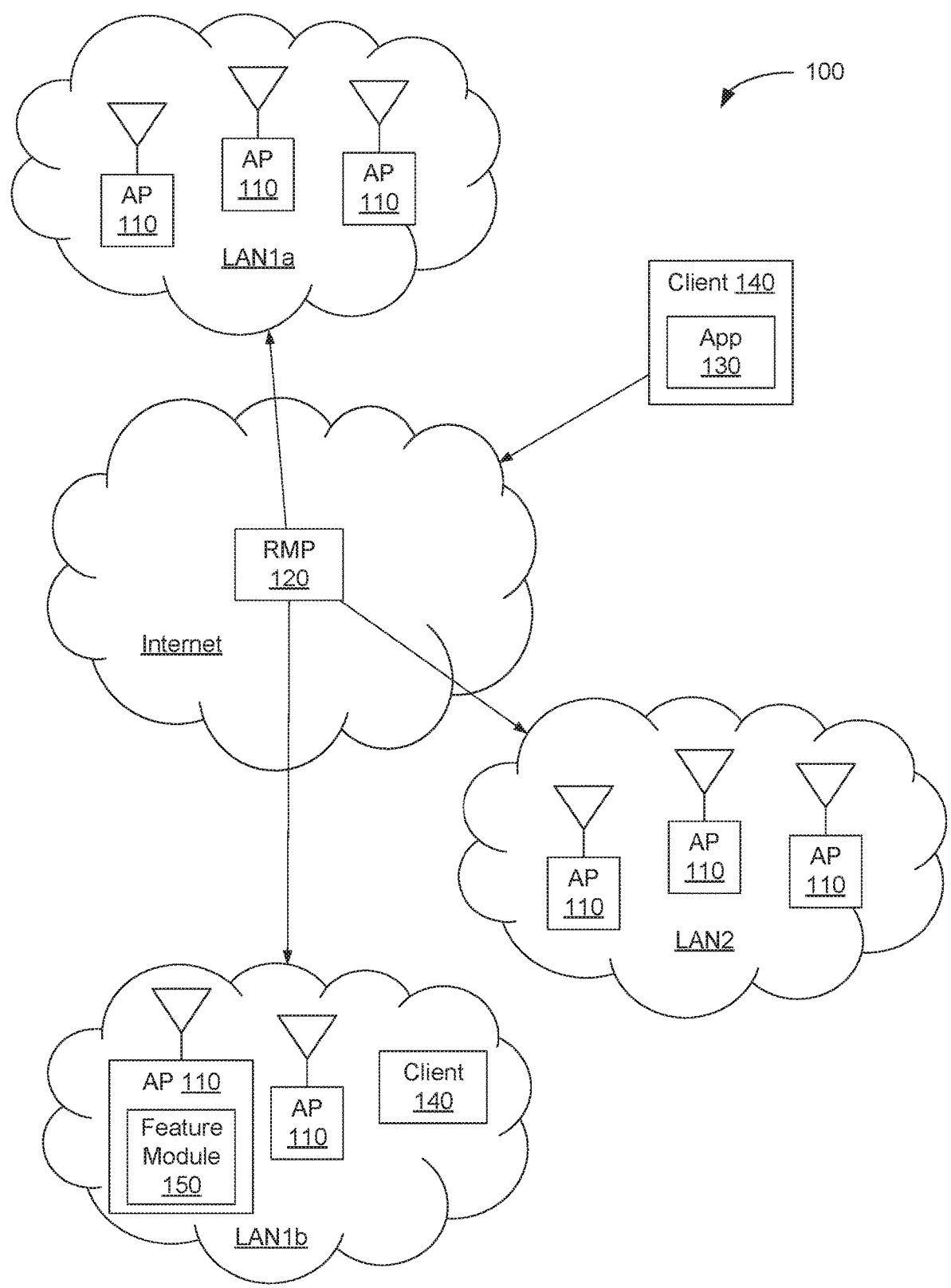
FIG. 1 is a block diagram illustrating hardware devices organized in a mesh network implementing selective feature announcement for per-client device control, according to an embodiment.

Technology for mesh network management including selective feature announcement for per-client device control is described herein. Nodes of a mesh network may establish peer-to-peer wireless links for sharing data. In an illustrative example, a mesh network may be employed for providing network access to client devices in an environment of limited connectivity to broadband Internet infrastructure (e.g., for network access to homes in dense urban areas). In one embodiment, the mesh network uses IEEE 802.11 based Wi-Fi mesh networking.

Support for roaming (i.e., transitions of a client device from association with one access point device in the mesh network to another) is becoming more important in home network systems. Multiple access points serving the same network name or service set identifier (SSID) for wider coverage increases the importance of fast roaming from one access point to another, especially as Internet calling and voice over Internet Protocol (VoIP) are becoming mainline features.

Certain wireless communication protocols, including IEEE 802.11r address this concern. The IEEE 802.11r wireless communication protocol a Fast Basic Service Set (BSS) Transition feature that consumer electronics devices may choose to implement and support. The Fast BSS Transition feature permits continues network connectivity for client devices as they are in motion by enabling fast and secure handoffs from one access point to another in a seamless manner. Many of the new mobile devices, including smartphones, tablets, and laptop computers, already support the Fast BSS Transition feature. Certain client devices, however, choose not to implement or enable the Fast BSS Transition feature, although they may have the necessary hardware and/or firmware to support the feature. In addition, there may be other devices still, such as older mobile devices referred to herein as "legacy devices" or "legacy client devices" that were manufactured before the IEEE 802.11r wireless communication protocol was implemented. These legacy client devices may not only lack the hardware and/or firmware to support IEEE 802.11r, but may not respond to access points which advertise the Fast BSS Transition feature. When such legacy client devices receive wireless beacons or probe response messages from an access point announcing support for the Fast BSS Transition feature, they do not process the frames from these messages and will not associate with the access point. Since the legacy client devices are beyond the control of the mesh network, there may be no way to cause the legacy client devices to upgrade to support IEEE 802.11r or to otherwise change their behavior.

Aspects of the present disclosure address these and other deficiencies by implementing selective feature announcement for per-client device control of certain features, such as the Fast BSS Transition feature. In one embodiment, the techniques described herein allow an access point in the mesh network to recognize a legacy client device that may not support the Fast BSS Transition feature, and modify wireless beacons or probe response messages sent to that legacy client device to omit an indication of Fast BSS Transition feature. Thus, the access point can disable the Fast BSS Transition feature for that legacy client device, while still offering the Fast BSS Transition feature to other client devices that do support the feature. In another embodiment, an access point in the mesh network can detect that a client device is having connectivity problems when attempting to associate with the access point. In response, the access point can disable the Fast BSS Transition feature for all connected client devices allowing the client device to associate. The Fast BSS Transition feature can remain disabled until the subject client device disconnects from the mesh network for a certain period of time. In either embodiment, the access point can share an indication of the legacy client device that does not support or is incompatible with the Fast BSS Transition feature or other network feature with other access points in the mesh network. This may cause the other access points to selectively announce their support for the Fast BSS Transition feature, or to disable the Fast BSS Transition feature for a period of time, to allow the legacy client device to associate with the other access points (e.g., as the legacy client device changes location in the area covered by the mesh network).

In general the mesh network management techniques described herein include determining client device information and modifying access point operation based on the client device information. Such techniques can enable superior mesh network performance (e.g., for each client device of the mesh network, for the overall mesh network, etc.) by managing client device roaming. In addition, access points can optimize the use of optional network features (e.g., fast the BSS transition feature, as specified in IEEE 802.11r) while accommodating client devices that are incompatible with one or more of the features (e.g., by detecting such legacy client device incompatibilities and dynamically disabling the incompatible features in response).

FIG. 1 is a block diagram illustrating hardware devices organized in a mesh network implementing selective feature announcement for per-client device control, according to an embodiment. A system 100 for mesh network management can include a plurality of stations such as access point devices (APs) 110 (e.g., wireless routers, such as mesh network capable routers) and/or client devices 140 (e.g., mobile stations, such as computers, smart phones, etc.), and can additionally or alternatively include one or more router management platforms (RMPs) 120 and/or management applications 130. In one embodiment, the access point devices 110 and client devices 140 cooperatively define a mesh network (e.g., wherein the access point devices 110 are configured to provide Internet access, such as via a primary router connected by Ethernet to a cable modem) and an extended service set (ESS), but can additionally or alternatively define multiple networks (or no network) and/or multiple ESSs (or no ESS).

The system 100 can function to enable seamless wireless coverage of an area (e.g., a user's home) using mesh networking while reducing the complexity of configuring such a network. Typically, to configure an Internet-connected wireless mesh network, a user may configure a first router to serve as a gateway to the internet (e.g., by connecting the router to a cable modem). Further, some networking device (generally the aforementioned first router) is also configured to serve as a network address translation (NAT) server, a dynamic host configuration protocol (DHCP) server, and a wireless access point device. Then, to extend wireless coverage throughout the area, additional devices (e.g., wireless routers, access points, repeaters) are added. Even in the simple case of two or three wireless access points, the configuration options are virtually endless. For example, the access points could exist on a single bridged network, or could be separated into different networks (e.g., could be assigned to different virtual local area networks (VLANs)). The access points could be connected to each other by Ethernet cables, or simply serve as wireless repeaters. The access points could share available Wi-Fi channel space in any number of ways.

Even for experienced users, the array of network configurations available can be extremely overwhelming. In one embodiment, the system 100 performs much of this configuration both automatically and dynamically, thereby optimizing the network for a user's needs without requiring extensive computer networking knowledge or hassle. In other embodiment, however, the system 100 can be manually configured or otherwise configured.

In one embodiment, the access point devices 110 are dual-band routers (e.g., substantially similar to those described in U.S. patent application Ser. No. 15/008,251, the entirety of which is incorporated herein by reference). Additionally or alternatively, the access point devices 110 can be any suitable networking devices (e.g., smart access points).

In one embodiment, the access point devices 110 include a Wi-Fi radio, a Bluetooth radio, an Ethernet interface, and a processor. The access point devices 110, however, can include any suitable wireless or wired communication module. The access point devices 110 can additionally or alternatively include any other hardware or software. In one example implementation, a smart router includes multiple Wi-Fi radios including one or more 5 GHz radios and one or more 2.4 GHz radios, a Bluetooth radio capable of Bluetooth Smart communication, an auto-sensing gigabit Ethernet interface, an ARM processor, DDR RAM, EMMC storage (for router firmware), and a USB interface (e.g., for adding network-accessible storage).

The Wi-Fi radio(s) function(s) to provide wireless access to the access point devices 110. The Wi-Fi radio(s) preferably serve(s) to allow electronic client devices (e.g., smartphones, laptops, gaming consoles) to communicate wirelessly with the access point devices 110 and with each other through a LAN, as well as to allow access point devices 110 to communicate with each other over the mesh network.

In one embodiment, each Wi-Fi radio includes at least one antenna; additionally or alternatively, the Wi-Fi radio can include an interface to connect to an external antenna. Antennas can be of a variety of antenna types; for example, patch antennas (including rectangular and planar inverted F), reflector antennas, wire antennas (including dipole antennas), bow-tie antennas, aperture antennas, loop-inductor antennas, ceramic chip antennas, antenna arrays, and fractal antennas. The Wi-Fi radio(s) may support(s) communication over all of IEEE 802.11a/b/g/n/ac standards (e.g., and optionally over any other IEEE 802.11 standards, such as ax, k, r, v, etc.), but can additionally or alternatively support communication according to any standard or communication protocol (or no standard at all).

In one embodiment, the Wi-Fi radios operate using single-input/single-output (SISO) communication techniques, but can additionally or alternatively operate using multiple-input and/or multiple-output communication techniques (e.g., SIMO, MISO, MIMO). If the Wi-Fi radios operate using MIMO techniques, the Wi-Fi radios can use any type of MIMO techniques (e.g., precoding, spatial multiplexing, space-division multiple access, and/or diversity coding). Further, the Wi-Fi radios can perform MIMO communication either independently (e.g., a radio performs MIMO communication with multiple antennas coupled to that radio) or cooperatively (e.g., two separate radios perform MIMO communication together).

In one embodiment, the Bluetooth radio functions to allow devices to communicate with the access point devices 110 over a connection mechanism alternative to Wi-Fi. The Bluetooth radio can be used to allow the access point devices 110 to be configured for the first time by a smartphone (or other Bluetooth-enabled computing device). The Bluetooth radio can additionally or alternatively be used for any other purpose; for example, for configuring the access point devices 110 at a different time, for communication between access point devices 110, or for communication with smart devices in a home (e.g., smart locks, light bulbs). The Bluetooth radio may support the Bluetooth 4.0 standard, including communications capabilities for classic Bluetooth as well as Bluetooth Low-Energy (BTLE). The Bluetooth radio may switch between classic Bluetooth and Bluetooth Low-Energy, but can additionally or alternatively be capable of communicating over both simultaneously.

In one embodiment, the Ethernet interface functions to provide wired connectivity to the access point devices 110. The Ethernet interface can allow wired devices (including other access point devices 110) to connect to the access point devices 110. The Ethernet interface can include a plurality of Ethernet ports. Ports of the Ethernet interface may be capable of 1000BASE-T (i.e., gigabit) communication, but can additionally or alternatively be capable of communication at any rate. The Ethernet interface can automatically set the communication rate based on the capabilities of connected devices, but can additionally or alternatively set the communication rate manually. In addition to the Ethernet interface, the access point device 110 can additionally or alternatively perform wired communication over any wired interface. For example, the access point device 110 can perform communication through a power line interface (e.g., Ethernet over Power).

Each access point device 110 may include a microprocessor and can additionally or alternatively include any other hardware. For example, the access point devices 110 can include a USB interface (for connection of network-attached storage, a DLNA server, etc. or for configuration purposes). In one embodiment, the access point devices 110 include a hardware encryption module (HEM). The HEM is preferably a chip that stores an encryption key securely (e.g., the Atmel SHA204) and performs data encryption based on that key, but can additionally or alternatively be any hardware module capable of encrypting transmissions from and/or decrypting transmissions to the access point devices 110.

In one embodiment, the access point devices 110 store firmware and/or software on an embedded MultiMediaCard (eMMC), but can additionally or alternatively store firmware and/or software in any suitable storage solution. The access point devices 110 may operate as a Linux server running Python programs, but can additionally or alternatively operate using any software and/or firmware. The access point devices 110 can be configured using the management application 130 operating on a client device 140 or other remote electronic device (e.g., a user's smartphone), but can additionally or alternatively be configured by any suitable manner (e.g., by a web interface).

The access point devices 110 can communicate with each other using the IEEE 802.11s protocol (and/or a modified version thereof), such as using Simultaneous Authentication of Equals (SAE)-based encryption and hybrid wireless mesh protocol (HWMP) path selection, but can additionally or alternatively communicate with each other in any manner. In one embodiment, the access point devices 110 are configured and/or managed by the router management platform 120 (or any suitable remote management platform). For example, access point devices 110 can be configured by altering stored configuration profiles in a remote server (e.g., part of the router management platform 120), after which the stored configuration profiles are pushed to the access point devices 110. This technique is particularly useful in mesh networking applications; if the router management platform 120 is aware that three smart routers are intended for use in a single network, the router management platform 120 can attempt to bridge the networks of the three routers regardless of physical location or existing network topology.

The router management platform 120 can additionally function to manage connections and/or permissions associated with various networks. For example, a user of the router management platform 120 associated with one network can have guest permissions on another network (e.g., users of LAN1 can be granted permissions with respect to LAN2 via the platform). As another example, the router management platform 120 can be used for (or can otherwise facilitate) bridging two networks via a VPN tunnel (e.g., two physical networks LAN1a and LAN1b into a single logical network). The router management platform 120 can additionally or alternatively be used to collect connection data from the access point devices 110 and/or provide this data (or analysis of this data) to users either via the access point devices 110 or otherwise (e.g., via a web portal).

The system 100 can additionally include a management application 130 that functions to manage access point devices 110 that are part of a network. The management application 130 may be a native application running on a smartphone (e.g., an iOS or Android application), but can additionally or alternatively be any suitable application (e.g., a web app, a desktop app, etc.). The management application 130 can be used to perform or aid in access point device 110 configuration, but can also be used to collect data used to implement the functionality described herein. For example, management application 130 operable on a client device 140 for which location data is desired can collect (and potentially analyze and/or transmit) data that can be used to perform device localization.

Access point devices 110 of the same LAN can be communicatively coupled together to form a mesh network. Access point devices 110 can communicate to each other and/or to client devices 140 in any manner, e.g., 2.4 GHz Wi-Fi, 5 GHz Wi-Fi, Bluetooth, wired Ethernet. The channels used by the radios of the access point devices 110 can be set to reduce interference across the network. For example, two access point devices 110 near each other can use the same 5 GHz band (allowing those two access point devices 110 to communicate with each other and with devices, but potentially causing collisions for communication from client devices 140 near both access point devices 110), but a different 2.4 GHz band (allowing client devices 140 near both access point devices 110 to communicate to one access point 110 without interfering with communication of other client devices 140 to the other access point device 110). Access point device 110 channels can be orthogonal or overlapping. For example, access point devices 110 near each other can choose different, but overlapping, 2.4 GHz bands, allowing those access point devices 110 to still communicate with each other while also reducing client device interference.

Access point channels can be set in any manner. In one example implementation, a first access point device 110 selects a 2.4 GHz channel (referred to as 2.4A) and a 5 GHz channel (5A) based on a radio survey. Each additional access point device 110 then selects the same 5 GHz channel (5A) but selects the 2.4 GHz channel based on a radio survey (e.g., trying to minimize 2.4 GHz interference between access point devices 110). Access point channels can be set individually by access point devices 110, in concert by a set of access point devices 110, by the management platform 120, or by any other agent.

Access point channels can also be modified at any time. For example, an access point device 110 having selected a channel by the technique described in the preceding paragraph can switch its 5 GHz channel in response to heavy traffic on that channel by client devices 140. Note that in this case, the access point device 110 may additionally need to change its 2.4 GHz channel as well (as the access point device 110 may have to communicate with other stations on the 2.4 GHz band now instead of the 5 GHz band).

Access point devices 110 can additionally or alternatively attempt to modify any other parameters related to inter-access point links and/or access point-client links. For example, access point devices 110 can adjust antenna patterns and/or gain to reduce network interference. Additionally or alternatively, access point devices 110 can perform beam-forming or beam-steering (potentially with dynamic gain) for the same purpose. Similar to channels, other access point parameters can be set individually by access point devices 110, in concert by a set of access point devices 110, by the management platform 120, or by any other agent.

In one embodiment, one or more of access point devices 110 (e.g., all of access points 110) include a feature module 150. Feature module 150 implements selective feature announcement for per-client device control of certain features, such as the Fast BSS Transition feature. In one embodiment, the techniques described herein allow an access point device 110 in the mesh network to recognize a legacy client device 140 that may not support the Fast BSS Transition feature, and modify wireless beacons or probe response messages sent to that legacy client device to omit an indication of Fast BSS Transition feature. Thus, the access point device 110 can disable the Fast BSS Transition feature for that legacy client device 140, while still offering the Fast BSS Transition feature to other client devices that do support the feature. In another embodiment, an access point device 110 in the mesh network can detect that a client device 140 is having connectivity problems when attempting to associate with the access point device 110. In response, the access point can disable the Fast BSS Transition feature for all connected client devices allowing the client device 140 to associate. The Fast BSS Transition feature can remain disabled until the client device 140 disconnects from the mesh network for a certain period of time. In either embodiment, the access point device 110 can share an indication of the legacy client device 140 that does not support or is incompatible with the Fast BSS Transition feature or other network feature with other access point devices 110 in the mesh network. This may cause the other access point devices 110 to selectively announce their support for the Fast BSS Transition feature, or to disable the Fast BSS Transition feature for a period of time, to allow the legacy client device 140 to associate with the other access point devices 110 (e.g., as the legacy client device 140 changes location in the area covered by the mesh network).

Since legacy client devices, such as client device 140, may not be able to process wireless beacon or probe request frames that include information pertaining to the Fast BSS Transition feature, feature module 150 can enable access point device 110 to avoid sending wireless beacon or probe request frames that include such information to those legacy client devices 140. Selectively modifying beacon frames may not be possible, since those wireless beacons are broadcast by the access point, and then received and processed by all of the client devices within range of the mesh network. Probe responses messages, however, are client-specific, and thus, feature module 150 can selectively omit the information pertaining to the Fast BSS Transition feature from the frames of those messages.

In one embodiment, the selective omission is based on capabilities that are sent to the access point device 110 in frames of a probe request message by the client device 140. If the information in the frames of the probe request message indicates that the client device 140 does not support at least one of the IEEE 802.11ac or 802.11n wireless communication protocols, then feature module 150 will cause access point device 110 to omit information pertaining to the Fast BSS Transition feature or other network feature from a probe response message sent to client device 140. In another embodiment, if the information in the frames of the probe request message indicates that the client device 140 supports IEEE 802.11, 802.11a, 802.11b, and/or 802.11g, but not any other more recently implemented wireless communication protocols, then feature module 150 will cause access point device 110 to omit information pertaining to the Fast BSS Transition feature or other network feature from a probe response message sent to client device 140. When that same client device 140 is continuing with authentication and association, the information pertaining to the Fast BSS Transition feature will be omitted from any relevant messages. As a result, the client device 140 can connect to the access point device 110 successfully. Access point device 110 will enable any transitions of client device 140 to another access point device in the mesh network using some other technique besides the Fast BSS Transition feature. The Fast BSS Transition feature may still be utilized by other client devices associated with the access point device 110. In one embodiment, the physical wireless access point device 110 (also referred to herein as simply an "access point") includes one or more virtual access points. These virtual access points may be logical representations of an access point device, each being separately configurable. For example, there may be a different virtual access point for each network provided by the access point device 110. These different networks may include networks of different bandwidths (e.g., 2.4 GHz, 5 GHz), networks having different access controls (e.g., a main network, a guest network), or any other network provided by access point device 110 having its own SSID. Thus, in one embodiment, feature module 150 can disable the certain features (e.g., the Fast BSS Transition feature) on a per-virtual access point level. For example, if the legacy client device for which the number of disconnects meets or exceed the threshold amount is associated with a certain virtual access point, feature module 150 may disable the certain feature for the client devices associated with that virtual access point. Other virtual access points running on access point device 110 may continue to offer the certain feature to client devices associated with those other virtual access points. Accordingly, disabling a certain feature by an access point device 110 may include disabling the feature by at least one virtual access point running on the physical access point device 110.

In one embodiment, after a client device 140 connects to access point device 110, it may disconnect in a short time (e.g., approximately 5 seconds). This unplanned disconnection may be attributable to the legacy client device's inability to process wireless beacons containing the information pertaining to the Fast BSS Transition feature which are broadcast by the access point. The client device 140 may attempt to connect for the second time, and ultimately suffer another disconnection after another 5 seconds. Feature module 150 may recognize this operations loop and determine that the client device 140 is a legacy client device that does not support or is incompatible with the Fast BSS Transition feature. Accordingly, feature module 150 may deactivate the Fast BSS Transition feature on the access point device 110 without user intervention or notice. For example, if a client device connects and disconnects n times within t minutes, feature module 150 may flag this client device as a legacy client device and deactivate the Fast BSS Transition feature.

In one embodiment, feature module 150 may look for client devices that connect and disconnects three or more times in approximately 60 seconds.

Deactivating the Fast BSS Transition feature may increase roaming times of the client devices as other methods of transitioning to another access point may not be as efficient. Therefore, reactivating the Fast BSS Transition feature may be desirable when the legacy client device 140 gets disconnected from the access point device 110. It may not be preferable to turn the Fast BSS Transition feature back on as soon as the legacy client device 140 disappears, however. Accordingly, feature module 150 may determine whether the legacy client device disconnected more than t minutes ago (e.g., 30 minutes), and then mark this device as disconnected. If there are no legacy devices connected to this access point device 110, feature module can turn the Fast BSS Transition feature back on.

Figure 2:
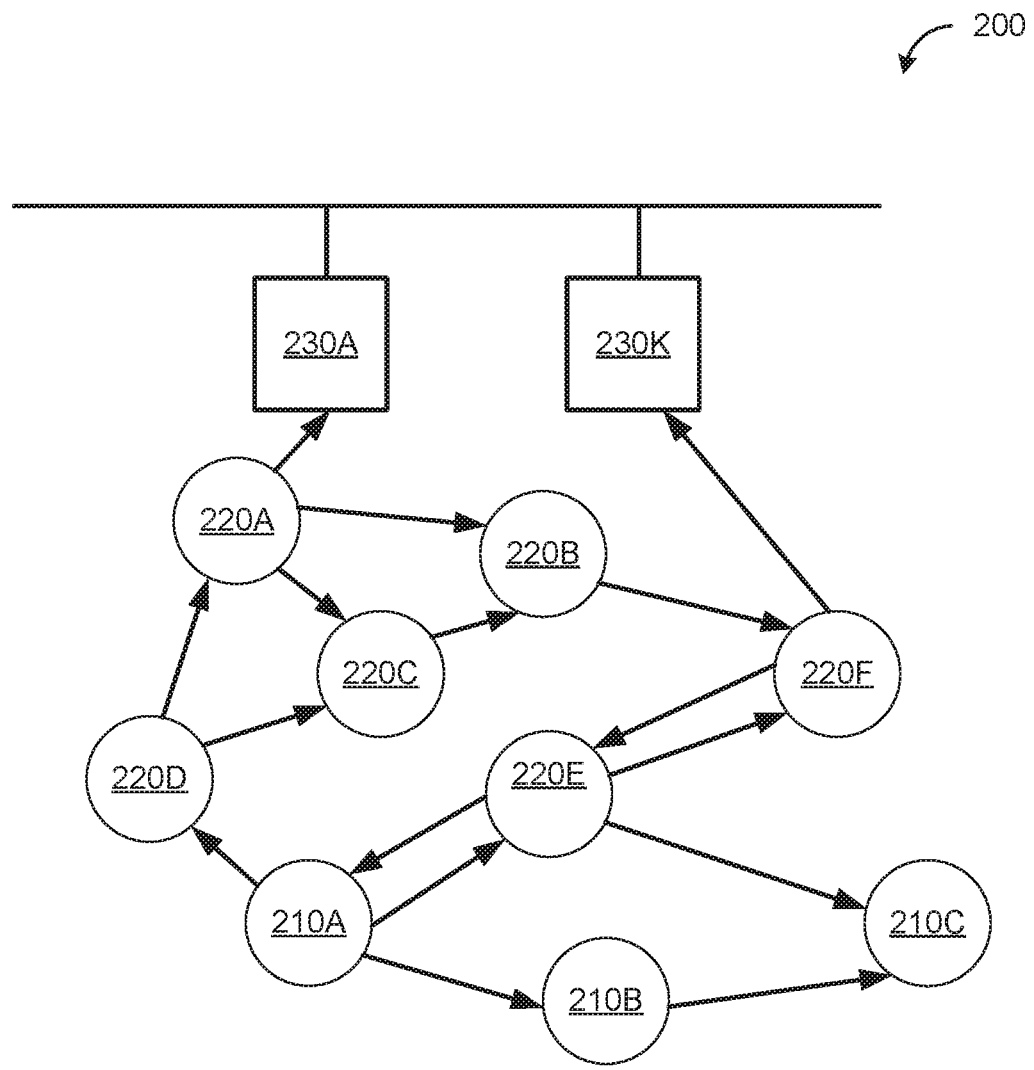
FIG. 2 is a functional network diagram of an illustrative example of a mesh network operating in accordance with embodiments of the present disclosure.

FIG. 2 is a functional network diagram of an illustrative example of a mesh network operating in accordance with embodiments of the present disclosure. In one embodiment, each of the network devices of the mesh network of FIG. 1 may implement functions of one or more functional components of FIG. 2. In other embodiments, various other mesh networks may include hardware and/or software components which may implement functions of one or more functional components of FIG. 2.

As schematically illustrated by FIG. 2, an example mesh network 200 may include a plurality of mesh network nodes including communication devices that implement the functions of wireless mesh point stations (MP STA) 210A-210C, mesh access points (MAP) 220A-220F, and mesh portals (MPP) 230A-230K. In one embodiment, the wireless mesh network 200 may be compliant with IEEE 802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices (e.g., access points) may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a mesh network operating in accordance the embodiments of the present disclosure (e.g., the mesh network of FIG. 1). Discovering available mesh networks may be performed by passive or active scanning. In the passive scanning mode, the network device records the information from any beacon frames that have been received on one or more radio channels. Beacon frames are periodically transmitted by wireless access points in order to allow network devices to detect and identify the mesh network, as well as match communication parameters for determining whether to join the mesh network. In the active scanning mode, the network device may transmit, on each of one or more radio channels supported by the network device, probe request frames in order to solicit responses from available networks. An access point receiving a probe request may generate a probe response advertising the network parameters.

Figure 3:
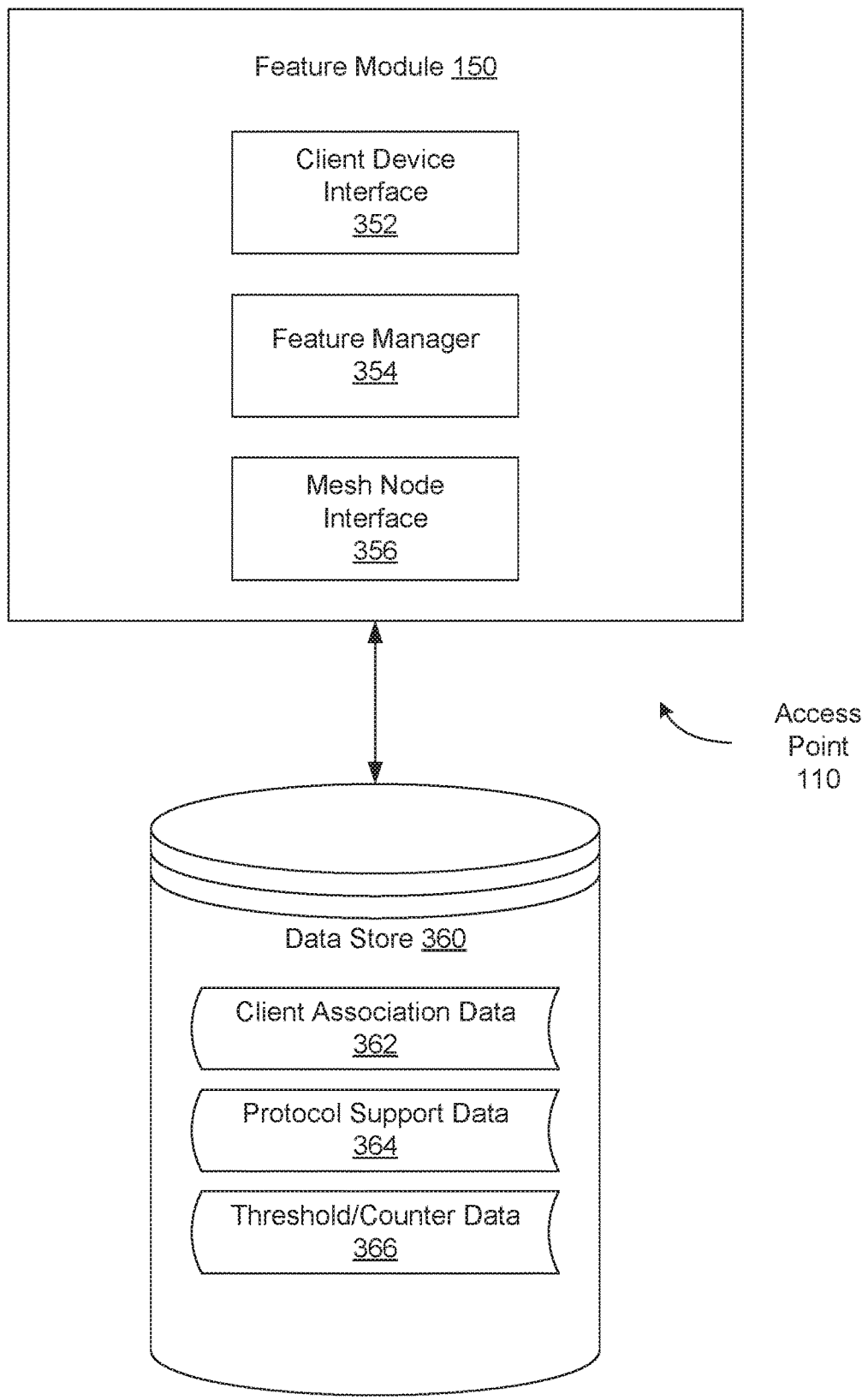
FIG. 3 is a block diagram illustrating a feature module included in an access point, according to an embodiment.

FIG. 3 is a block diagram illustrating a feature module 150 that is included in an access point device 110 of a mesh network, according to an embodiment. In one embodiment, feature module 150 includes client device interface 352, feature manager 354, and mesh node interface 356. This arrangement of modules and components may be a logical separation, and in other embodiments, these modules or other components can be combined together or separated in further components, according to a particular implementation. In one embodiment, data store 360 is connected to feature module 150 and includes client association data 362, protocol support data 364, and threshold/counter data 366. In one implementation, one physical node (e.g., access point device 110) may include both feature module 150 and data store 360. In another embodiment, data store 360 may be external to the physical node and may be connected over a network or other connection. In other implementations, the physical node and feature module 150 may include different and/or additional components and applications which are not shown to simplify the description. Data store 360 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, client device interface 352 manages communications between access point 110 and client devices in the mesh network, such as client device 140. For example, client device interface 352 may broadcast a wireless beacon including one or more beacon frames advertising the access point 110 to all of the client devices in the mesh network. In response to the wireless beacon, client device interface 352 may receive a probe request message including one or more probe request frames from a certain client device, such as client device 140. The probe request frames may include an indication of one or more wireless communication protocols supported by client device 140. In response to the probe request message, client device interface 352 may send a probe response message including one or more probe response frames to the client device 140. As described herein, the probe response frames may include an indication of a certain feature offered by the access point 110, such as the Fast BSS Transition feature, or may omit the indication of the feature, as appropriate for the particular client device 140. In response to the probe response message, client device interface 352 may receive an association request from the client device 140 as part of the IEEE 802.11 wireless communication protocol and may establish an association of the client device 140 with the access point 110. The association may be referred to as a connection, establishing the association may be referred to as forming a connection, and a device that has an association with an access point may be referred to as being connected to that access point.

In one embodiment, feature manager 354 enables selective feature announcement for access point 110 and controls whether certain features are enabled or disabled for different client devices associated with the access point 110. For example, feature manager 354 may determine whether a client device 140 is a legacy client device that does not support or is incompatible with a certain feature, such as the Fast BSS Transition feature. To make such a determination, feature manager 354 may determine, using client association data 362, whether client device 140 has previously failed to associate with the access point 110. If so, feature manager 354 may omit an indication of certain features from the probe response messages sent by client device interface 352 to the client device 140 and may disable those features for the client device 140. In another embodiment, feature manager 354 may determine, using protocol support data 364, whether the client device 140 supports certain expected wireless communication protocols (e.g., IEEE 802.11ac or IEEE 802.11n). If not, feature manager 354 may omit an indication of certain features from the probe response messages sent by client device interface 352 to the client device 140 and may disable those features for the client device 140. In another embodiment, feature manager 354 may track, using threshold/counter data 366, a number of times that a client device 140 disconnects from access point 110 in a threshold period of time. If the number of times that the client device 140 has disconnected, feature manager 354 may disable certain features on the access point 110 to enable the client device 140 to connect and remain connected. Feature manager 354 may determine when that client device 140 has been disconnected for a threshold period of time and may re-enable the disabled features.

In one embodiment, feature manager 354 determines information amount client devices having an association with (i.e., connected to) the access point 110. This client information can include connection link metrics, feature support classes, client activity, client priority, client spatial information, expected behavior and/or needs, and/or any other suitable information associated with one or more client devices. Feature support classes can include levels of support for one or more features (e.g., optional features, such as the Fast BSS Transition feature) and/or levels of confidence in the classification. In one example, the levels of support can include 'enabled' (e.g., the client device can and/or will use the feature), 'disabled' (e.g., the client device will not use the feature), and 'feature-incompatible' or 'legacy' (e.g., the client device cannot operate with an access point that is using the feature). In a second example, the levels of support can include 'legacy' and 'non-legacy'. The levels of confidence can include 'possible', 'likely', 'almost certainly', 'certainly', and/or any other suitable classes. However, the feature support classes can include any other suitable classes.

Support determination can include determining possible support, likely support, a conservative (e.g., fail-safe) guess, and/or any other potential determination. In one example, the feature support determination can be based on communication with the client device 140 (e.g., receiving a probe request). In specific examples, the determination can be based on the client device's stated protocol support (e.g., wherein no support for 802.11n and/or ac can suggest that it is possibly a legacy device), identifying information such as the MAC or OUI (e.g., looking up the identifying information in a device table), and/or one or more characteristics associated with a feature support class (e.g., wherein a probe request that does not include feature information can suggest that the device may not support the feature). In additional examples, the determination can be based on user inputs, client device connection attempt patterns and/or schedules, the client device path through physical space (e.g., received from the client device, estimated, learned from historical behavior, etc.), and/or any other suitable information. The feature support determination is preferably performed in response to detecting transmission from the client (e.g., initial access point communication with the client), but can additionally or alternatively be performed at any other suitable time.

Omitting feature-related information from access point transmissions can function to enable initial association with legacy devices. Feature manager 354 may omit all potentially-incompatible information (e.g., feature capability announcements), but can additionally or alternatively include omitting any suitable subset of the information, and/or omitting any other feature-related information. The information may be omitted in response to determining that a client device is potentially feature-incompatible, but can additionally or alternatively be omitted at any other suitable time. The information can be omitted selectively (e.g., based on the determined feature support, wherein it is omitted only for potential legacy devices). For example, feature manger 354 can omit the information from client-specific transmissions (e.g., frames related to probes, authentication, association, 4-way handshakes, subsequent data frames, etc.), but not from beacon frames (which are not client-specific). Feature manager 354 could optionally send two (or more) versions of some or all frames (e.g., to each client device, each potential legacy device, etc.): one frame including the information and one frame omitting it. However, the information can additionally or alternatively be omitted from all transmissions and/or for all client devices.

In one embodiment, mesh node interface 356 manages communications between access point 110 and other mesh nodes (e.g., access point devices) in the mesh network. For example, mesh node interface 356 may send an indication that a certain client device 140 is a legacy client device that does not support or is incompatible with a certain feature, such as the Fast BSS Transition feature. In one embodiment, the indication includes a single bit value (e.g., a logical "1" indicates that the client devices supports the features and a logical "0" indicates that the client device does not support or is incompatible with the feature). In other embodiments, the indication includes some other multi-bit value. Access points 110 have an inter-node communication mechanism as described above, through which they share information pertaining to which client devices are currently associated with which access point. In one embodiment, mesh node interface 356 may append the indication of feature support to or otherwise include the indication with these messages. In other embodiments, mesh node interface 356 may send the indication of feature support as a standalone message or as part of some other message sent to the other access points in the mesh network. Depending on the embodiment, mesh node interface 356 can sent the messages in either a broadcast format to all of the mesh nodes in the mesh network or in a unicast format to certain neighboring nodes separately. In one embodiment, mesh node interface 356 sends the messages at periodic intervals. The length of the intervals may vary depending on certain conditions. For example, mesh node interface 356 may send the messages with a first frequency upon start-up or re-start of the access point 110 and send the messages with a second frequency after a certain amount of time has passed or a certain number of messages have been sent.

Figure 4:
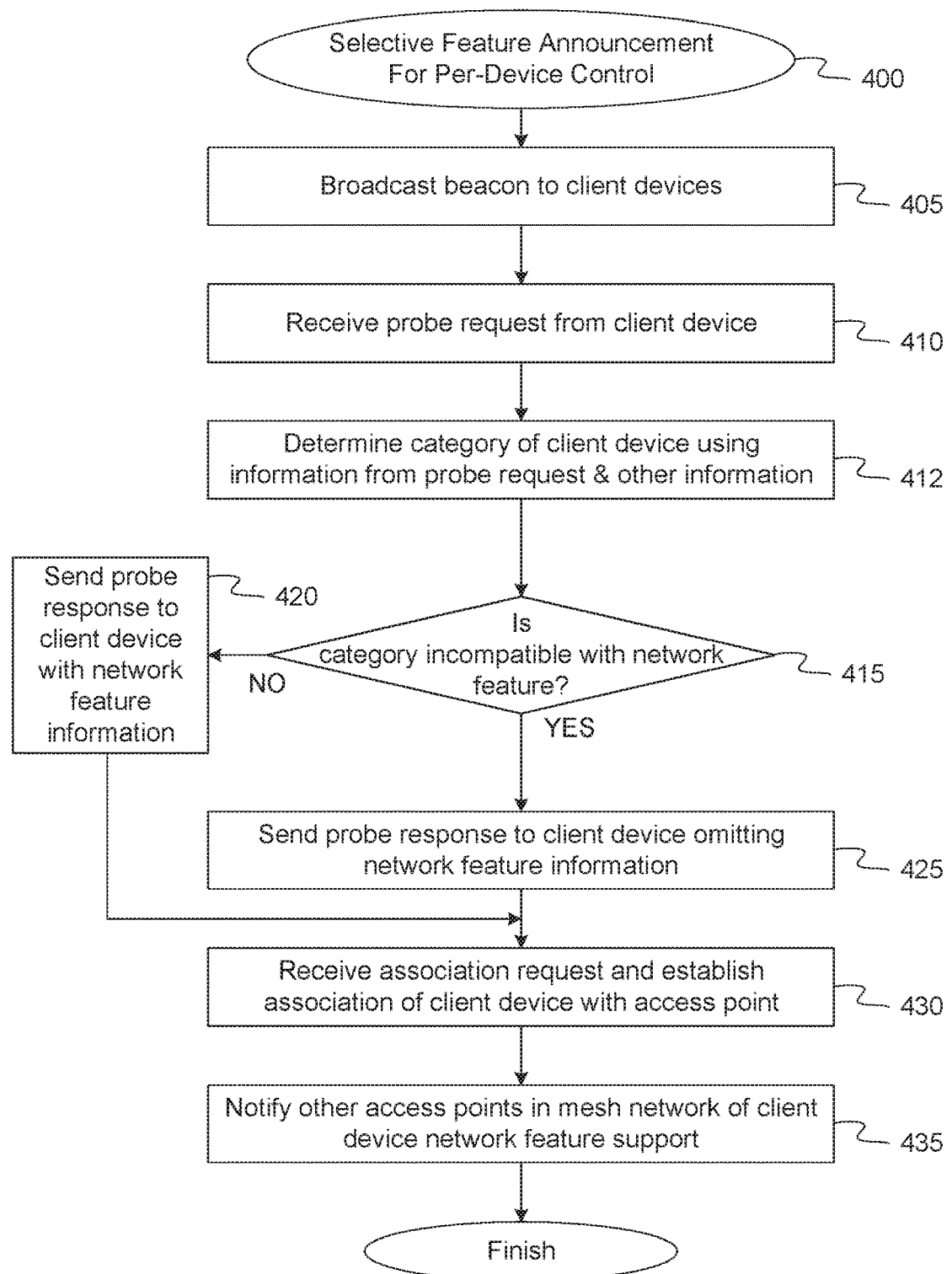
FIG. 4 is a flow diagram illustrating method of selective feature announcement in a mesh network for per client-device control, according to an embodiment.

FIG. 4 is a flow diagram illustrating method of selective feature announcement in a mesh network for per client-device control, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by feature module 150, within access point 110, as shown in FIG. 1 and FIG. 3.

Referring to FIG. 4, at block 405, method 400 broadcasts or otherwise sends a wireless beacon to a plurality of client devices seeking to connect to a mesh network comprising a wireless access point device 110. In one embodiment, client device interface 352 sends the wireless beacon including one or more beacon frames advertising the wireless access point device 110 to any client devices within range of the wireless access point device 110.

At block 410, method 400 receives a probe request message from a first client device 140 of the plurality of client devices. In one embodiment, client device interface 352 receives the probe request message including one or more probe request frames. The probe request frames may include an indication of one or more wireless communication protocols supported by the first client device 140.

At block 412, method 400 determines, at least partially using information obtained from the probe request message and using other information not present in the probe request message, a category of the first client device 140. Depending on the embodiment, feature manager 354 may determine whether the one or more wireless communication protocols supported by the first client device 140 matches an expected set from protocol support data 364, or may determine, using client association data 362, whether the first client device previously failed to associate with the wireless access point device 110. The results of these determinations or other determinations may indicate whether the first client device 140 is in a first category (e.g., legacy client devices) or in a second category (e.g., non-legacy client devices). In other embodiments, there may be different categories or some other number of these or additional categories. In one embodiment, the information obtained from the probe request message may include the indication of the one or more wireless communication protocols supported by the first client device 140, or any other data present in the information elements of the probe request message. The other information not present in the probe request message (e.g., protocol support data 364) may include, for example, a set of wireless communication protocols (or other data) known to be supported by non-legacy client devices or a set of wireless communication protocols (or other data) known to not be supported by legacy client devices.

At block 415, method 400 determines whether the category of the first client device 140 is incompatible with a certain feature offered by the wireless access point device 110. Additional details of the determinations made at blocks 412 and 415 are provided below with respect to the description corresponding to FIG. 5 and FIG. 6.

In addition to determining whether the first client device 140 is incompatible with the certain feature, method 400 may further determine additional information pertaining to the client device 140. For example, feature module 150 (or some other logic of access point 110) determines whether to allow the first client device 140 to associate with the access point 110. In one embodiment, feature module 150 determines a unique identifier of the first client device 140 (e.g., a MAC address) and compares the unique identifier to a blacklist or other indication of devices that are not permitted to connect to access point 110. The blacklist may be maintained in data store 360, for example as part of client association data 362. If the MAC address of the first client device 140 appears on the blacklist, feature module 150 may prevent the first client device 140 from associating with access point 110. For example, feature module 150 may delay or prevent the sending of a probe response message to the first client device 140, so that first client device 140 will instead connect to another access point. In another embodiment, feature module 150 compares the unique identifier to a whitelist or other indication of devices that are permitted to connect to access point 110. The whitelist may be maintained in data store 360, for example as part of client association data 362. If the MAC address of the first client device 140 does not appear on the whitelist, feature module 150 may prevent the first client device 140 from associating with access point 110.

In another embodiment, feature module 150 (or some other logic of access point 110) encourages the first client device 140 to connect to a network of a certain bandwidth instead of another network having another bandwidth. For example, if access point 110 provides networks at both 5 Gigahertz (GHz) and 2.4 GHz, feature module 150 may identify one network that is preferable for the first client device 140. Feature module 150 may identify this preferred network based on a number of factors, such as how many other devices are already connected to each network, the capability of the first client device 140 to connect to a less busy network, historical connection information of the first client device 140 to the different networks, etc. Upon identifying a preferred network, feature module 150 may delay or prevent may delay or prevent the sending of a probe response message pertaining to the less preferred network to the first client device 140, so that first client device 140 will instead connect to the preferred network.

If the first client device 140 is compatible with (i.e., is not incompatible with) the certain feature, at block 420, method 400 sends a probe response message to the first client device 140 indicating that the certain feature is enabled for the first client device 140. In one embodiment, feature manager 354 generates the probe response message including one or more probe response frames. The probe response frames may include an indication of a feature set enabled by the wireless access point device for the first client device 140. In this embodiment, the indication of the feature set includes an indication of the certain feature (e.g., the Fast BSS Transition feature).

If the first client device 140 is incompatible with the certain feature, at block 425, method 400 sends a probe response message to the first client device 140 either omitting any reference to the certain feature or indicating that the certain feature is disabled for the first client device 140. In one embodiment, feature manager 354 generates the probe response message including one or more probe response frames. The probe response frames may include an indication of a feature set enabled by the wireless access point device for the first client device 140. In this embodiment, the indication of the feature set omits an indication of the certain feature (e.g., the Fast BSS Transition feature).

At block 430, method 400 receives an association request from the first client device 140 and establishes an association of the first client device 140 with the wireless access point device 110, wherein the certain feature is either enabled or disabled for the first client device 140, as appropriate.

At block 435, method 400 sends, to a second wireless access point device in the mesh network, an indication that the first client device 140 does not support or is incompatible with the certain feature. In one embodiment, mesh node interface 356 may send the indication to cause the second wireless access point device to disable the certain feature for the first client device 140 if the first client device 140 attempts to associate with the second wireless access point device. For example, the second wireless access point device may send, responsive to a probe request message received from the first client device 140, a probe response message to the first client device indicating that the certain feature is disabled for the first client device or omitting an indication of the certain feature.

Figure 5:
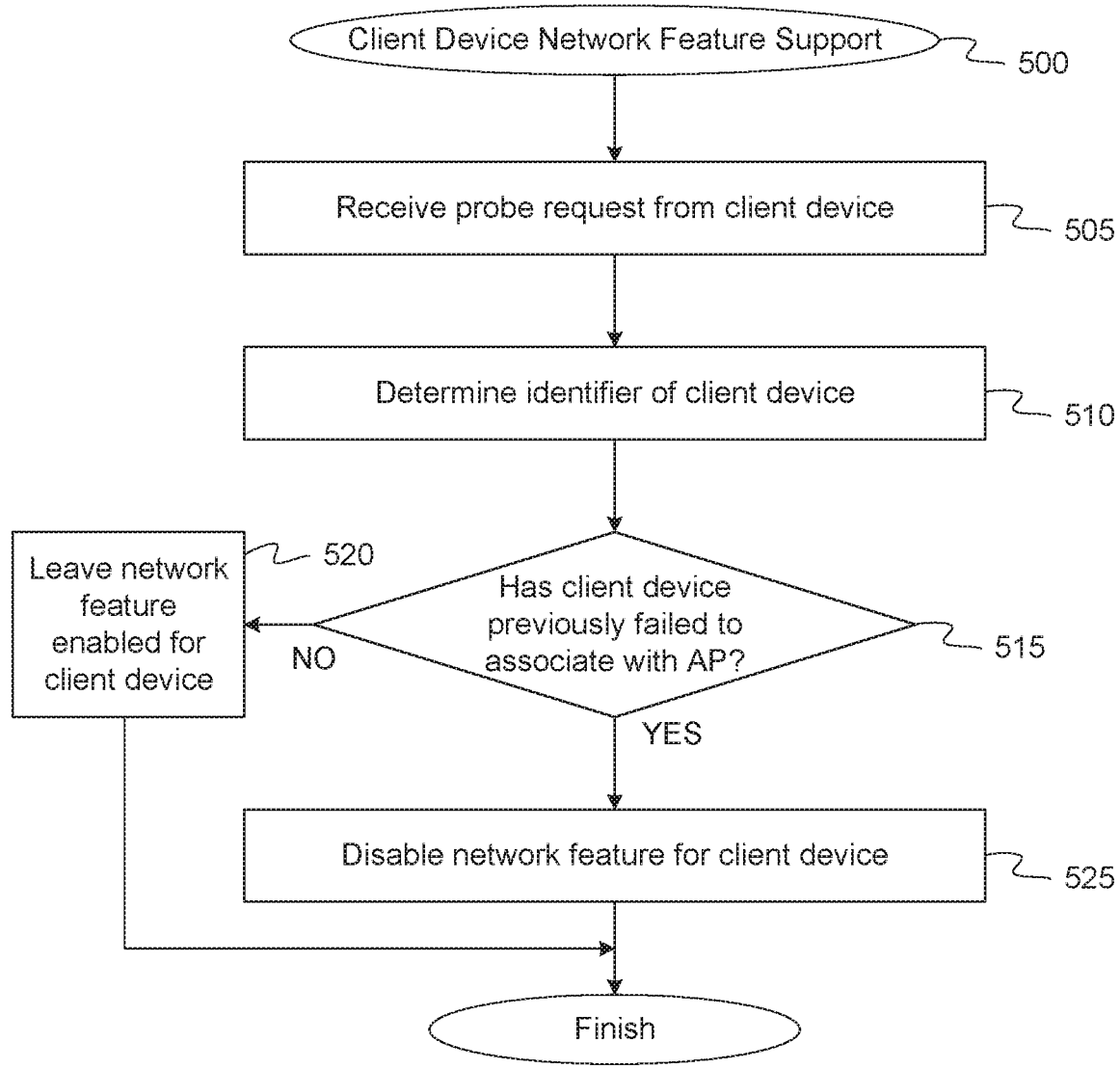
FIG. 5 is a flow diagram illustrating method of client device network feature support determination, according to an embodiment.

FIG. 5 is a flow diagram illustrating method of client device network feature support determination, according to an embodiment. The method 500 may be performed by processing logic that comprises hardware (e.g., circuitry, dedicated logic, programmable logic, microcode, etc.), software, firmware, or a combination thereof. In one embodiment, method 500 may be performed by feature module 150, within access point 110, as shown in FIG. 1 and FIG. 3.

Referring to FIG. 5, at block 505, method 500 receives a probe request message from a first client device 140. In one embodiment, client device interface 352 receives the probe request message including one or more probe request frames. The probe request frames may include a unique identifier of the first client device 140, such as a media access control (MAC) address or other identifier of the first client device 140. At block 510, method 500 determines this identifier from the information in the probe request message, and at block 515, method 500 determines whether the first client device 140 has previously failed to associate with the wireless access point device 110. In one embodiment, feature manager 354 compares the unique identifier of the first client device 140 to a log of previous associations with the wireless access point 110. For example, client association data 362 may include a log of successful and unsuccessful association attempts made by various client devices with the wireless access point 110. In one embodiment, feature manager 354 determines whether the log in client association data 362 includes an indication of the unique identifier of the first client device 140 having previously failed to associate with the wireless access point 110.

If feature manager 354 determines that the first client device 140 has not previously failed to associate with the wireless access point 110, at block 520, method 500 determines that the first client device 140 is a non-legacy device which is compatible with certain features offered by the wireless access point 110 and leaves those certain features enabled for the first client device 140. For example, feature manager 354 may continue to allow the first client device 140 to use the Fast BSS Transition feature.

If feature manager 354 determines that the first client device 140 has previously failed to associate with the wireless access point 110, at block 525, method 500 determines that the first client device 140 is a legacy client device which is incompatible with certain features offered by the wireless access point 110 and disables those certain features for the first client device 140. For example, feature manager 354 may prevent the first client device 140 from using the Fast BSS Transition feature, or may not even advertise the Fast BSS Transition feature as being available. In one embodiment, feature module 150 may continue to monitor the connection status of the first client device 140 after the Fast BSS Transition feature has been disabled. In one embodiment, if the first client device 140 continues to fail to associate with the access point 110, even though the Fast BSS Transition feature has been disabled, feature module 150 may re-enable the Fast BSS Transition feature as some other issue is likely the cause of the connection problems.

Figure 6:
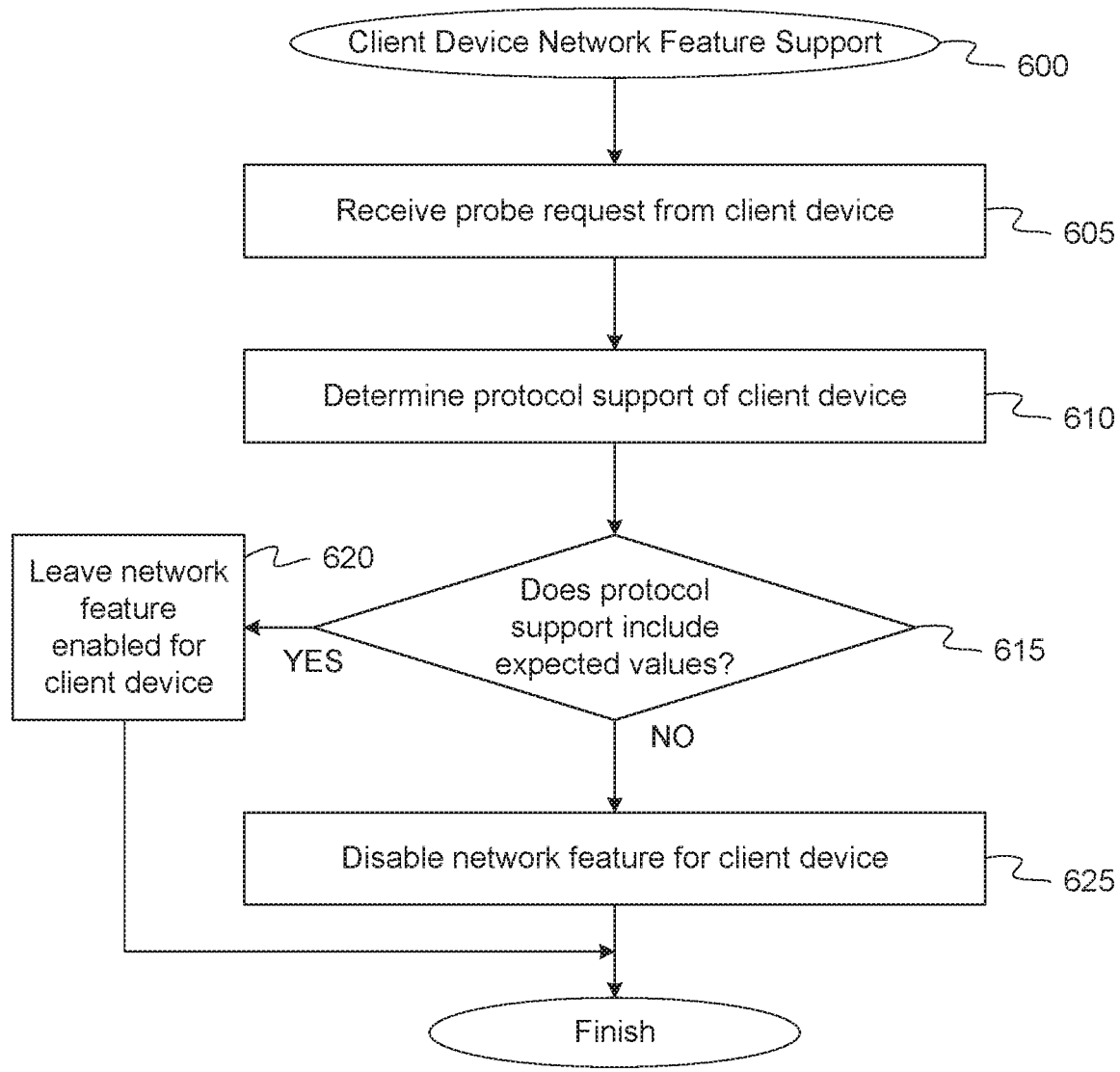
FIG. 6 is a flow diagram illustrating method of client device network feature support determination, according to an embodiment.

FIG. 6 is a flow diagram illustrating method of client device network feature support determination, according to an embodiment. The method 600 may be performed by processing logic that comprises hardware (e.g., circuitry, dedicated logic, programmable logic, microcode, etc.), software, firmware, or a combination thereof. In one embodiment, method 600 may be performed by feature module 150, within access point 110, as shown in FIG. 1 and FIG. 3.

Referring to FIG. 6, at block 605, method 600 receives a probe request message from a first client device 140. In one embodiment, client device interface 352 receives the probe request message including one or more probe request frames. The probe request frames may include an indication of one or more wireless communication protocols supported by the first client device 140. At block 610, method 500 determines which wireless communication protocols are supported by the first client device 140 from the information in the probe request message, and at block 615, method 600 determines whether the supported protocols include certain expected values. In one embodiment, feature manager 354 compares the wireless communication protocols supported by the first client device 140 to a list of expected protocols. For example, protocol support data 364 may include a list of expected protocols that are indicative of support for a certain feature (e.g., the Fast BSS Transition feature). In one embodiment, feature manager 354 determines whether the indication of the one or more wireless communication protocols supported by the first client device 140 specifies at least one of the IEEE 802.11ac or IEEE 802.11n wireless communication protocols.

If feature manager 354 determines that the first client device 140 does support at least one of the expected wireless communication protocols, at block 620, method 500 determines that the first client device 140 is a non-legacy device that is compatible with certain features offered by the wireless access point 110 and leaves those certain features enabled for the first client device 140. For example, feature manager 354 may continue to allow the first client device 140 to use the Fast BSS Transition feature.

If feature manager 354 determines that the first client device 140 does not support at least one of the expected wireless communication protocols, at block 525, method 500 determines that the first client device 140 is a legacy device that is incompatible with certain features offered by the wireless access point 110 and disables for the first client device 140. For example, feature manager 354 may prevent the first client device 140 from using the Fast BSS Transition feature, or may not even advertise the Fast BSS Transition feature as being available.

Figure 7:
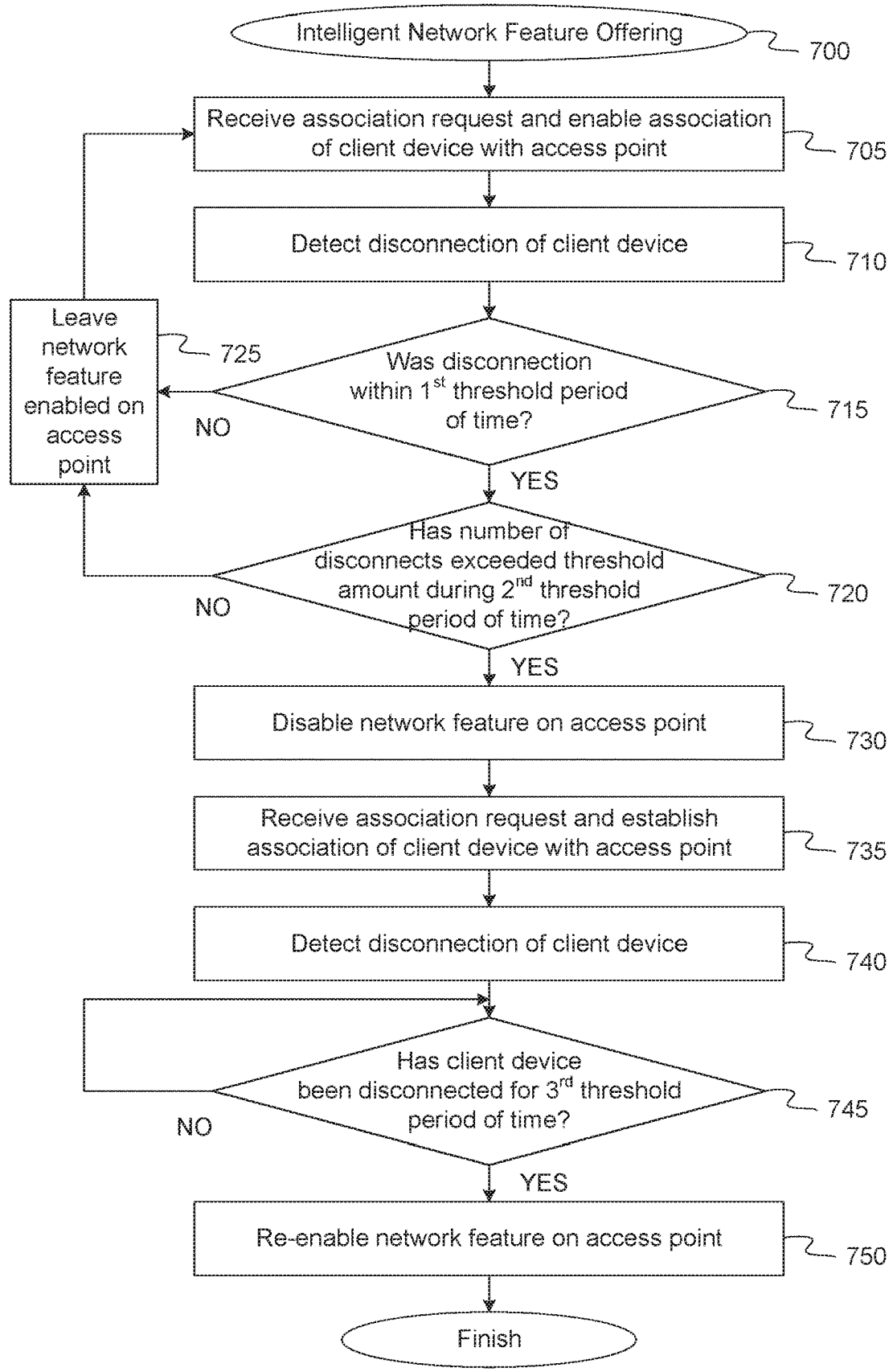
FIG. 7 is a flow diagram illustrating method of intelligent network feature offering in a mesh network, according to an embodiment.

FIG. 7 is a flow diagram illustrating method of intelligent network feature offering in a mesh network, according to an embodiment. The method 700 may be performed by processing logic that comprises hardware (e.g., circuitry, dedicated logic, programmable logic, microcode, etc.), software, firmware, or a combination thereof. In one embodiment, method 700 may be performed by feature module 150, within access point 110, as shown in FIG. 1 and FIG. 3.

Referring to FIG. 7, at block 705, method 700 receives an association request from the first client device 140 and establishes the association of the first client device 140 with the first access point device 110. At block 710, method 700 detects a disconnection of the first client device 140. In one embodiment, client device interface 352 detects that the first client device 140 having an association with the first access point device 110 has disconnected from the first access point device 110.

At block 715, method 700 determines whether the disconnection occurred within a first threshold period of time. For example, client device interface 352 may compare a current time to a time when the association of the first client device 140 was established (e.g., obtained from client association data 362) and determine whether a difference between those times is less than or equal to a threshold amount (e.g., 5 seconds). If the disconnection occurred within the first threshold period of time, at block 720, method 700 determines whether the first client device 140 has disconnected from the access point device 110 a certain number of times within a first threshold period of time. For example, client device interface 352 may increment a counter in threshold/counter data 366 for each disconnect that occurs, and compare the number of disconnects within a second threshold period of time to a threshold number of disconnects also in threshold/counter data 366.

If the number of disconnects within the second threshold period of time is less than the threshold number or if the disconnection did not occur within the first threshold period of time, at block 725, method 700 leaves certain features offered by the wireless access point 110 enabled all associated client devices. For example, feature manager 354 may continue to allow client devices to use the Fast BSS Transition feature and may continue to advertise the availability of the Fast BSS Transition feature in wireless beacons and probe response messages sent by the wireless access point 110.

If, however, the number of disconnects by the first client device 140 from the access point device 110 meets or exceeds the threshold amount, at block 730, method 700 disables certain features offered by the wireless access point 110 for all client devices. For example, feature manager 354 may prevent the client devices from using the Fast BSS Transition feature, or may not even advertise the Fast BSS Transition feature as being available. In one embodiment, the physical wireless access point device 110 includes one or more virtual access points. These virtual access points may be logical representations of an access point, each being separately configurable. For example, there may be a different virtual access point for each network provided by the access point device 110. These different networks may include networks of different bandwidths (e.g., 2.4 GHz, 5 GHz), networks having different access controls (e.g., a main network, a guest network), or any other network provided by access point device 110 having its own SSID. Thus, in one embodiment, method 700 disables the certain features (e.g., the Fast BSS Transition feature) on a per-virtual access point level. For example, if the legacy client device for which the number of disconnects meets or exceed the threshold amount is associated with a certain virtual access point, feature module 150 may disable the certain feature for the client devices associated with that virtual access point. Other virtual access points running on access point device 110 may continue to offer the certain feature to client devices associated with those other virtual access points.

At block 735, method 700 receives another association request from the first client device 140 and establishes the association of the first client device 140 with the first access point device 110 with the certain feature having been disabled. At block 740, method 700 detects a disconnection of the first client device 140. In one embodiment, client device interface 352 detects that the first client device 140 having an association with the first access point device 110 has disconnected from the first access point device 110.

At block 745, method 700 determines whether the first client device 140 has been disconnected from the first access point 110 for a third threshold period of time identified from threshold/counter data 366. If so, at block 750, method 700 re-enables the certain feature on the access point 110 for all currently connected and to be connected client devices.

Figure 8:
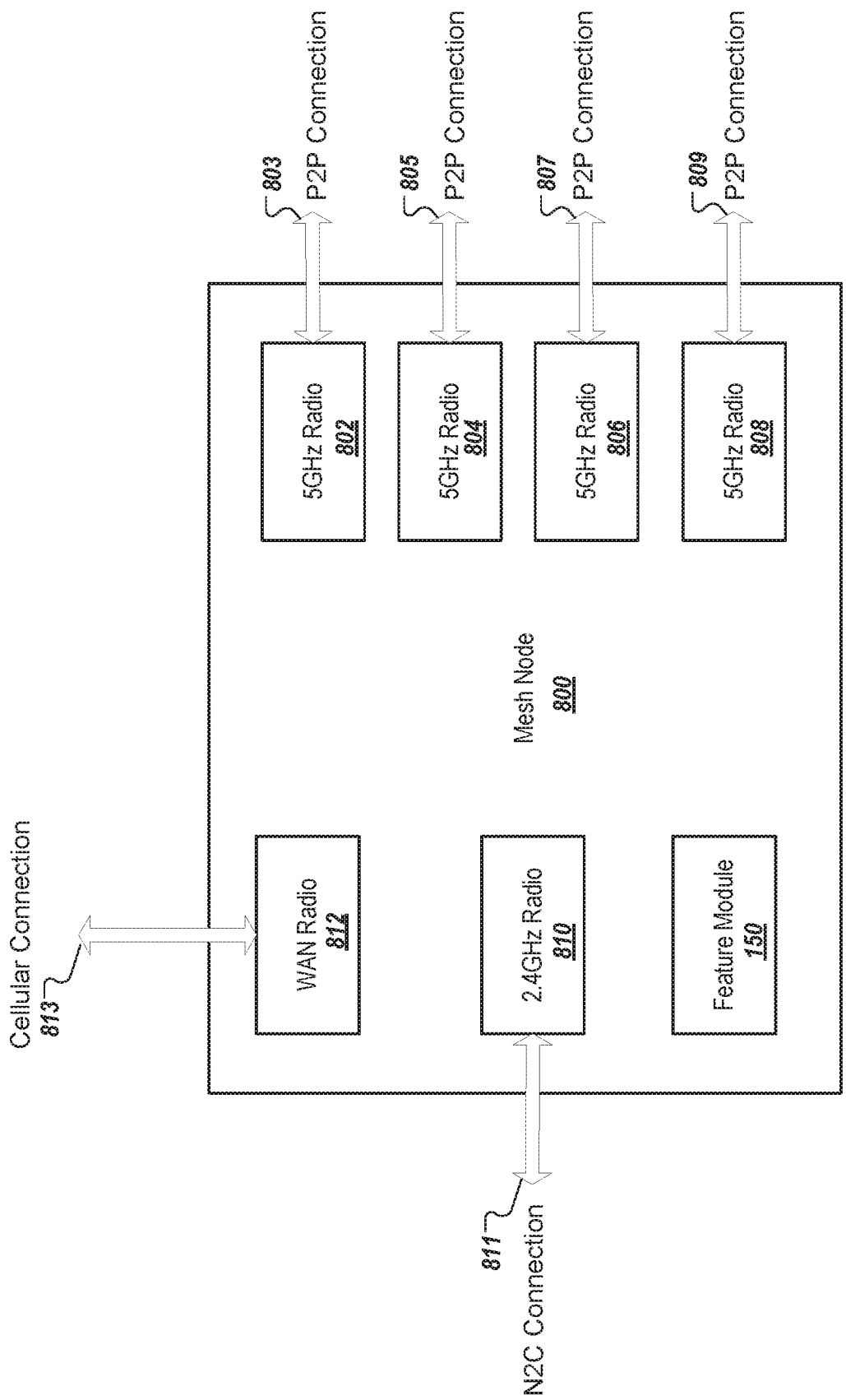
FIG. 8 is a block diagram of a mesh node with multiple radios according to one embodiment.

FIG. 8 is a block diagram of a mesh node 800 with multiple radios according to one embodiment. The mesh node 800 includes a first 5 GHz radio 802, a second 5 GHz radio 804, a third 5 GHz radio 806, a fourth 5 GHz radio 808, a 2.4 GHz radio 810, and a cellular radio 812. The first 5 GHz radio 802 creates a first P2P wireless connection 803 between the mesh node 800 and another mesh node (not illustrated) in a mesh network. The second 5 GHz radio 804 creates a second P2P wireless connection 805 between the mesh node 800 and another mesh node (not illustrated) in the mesh network. The third 5 GHz radio 806 creates a third P2P wireless connection 807 between the mesh node 800 and another mesh node (not illustrated) in the mesh network. The fourth 5 GHz radio 808 creates a fourth P2P wireless connection 809 between the mesh node 800 and another mesh node (not illustrated) in the mesh network. The 2.4 GHz radio 810 creates a N2C wireless connection 811 between the mesh node 800 and a client consumption device (not illustrated) in the mesh network. The N2C wireless connection may be one of a second set of one or more WLAN connections that operate at a second frequency of approximately 2.4 GHz. The cellular radio 812 creates a cellular connection between the mesh node 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 800 may be any one of the mesh network device described herein. In one embodiment, the mesh node 800 may be an ingress node or a mini-POP node that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 800 may receive a first request for a first content file from the first client consumption device over the first N2C connection 811. The mesh node 800 sends a second request for the first content file to a second network hardware device through the network backbone via a first set of zero or more intervening network hardware devices between the first network hardware device and the second network hardware device. The mesh node 800 receives the first content file through the network backbone via the first set of zero or more intervening network hardware devices and sends the first content file to the first client consumption device over the first N2C connection 811. In a further embodiment, the mesh node 800 includes the WAN radio 812 to wirelessly connect to a MNCS device by a cellular connection 813 to exchange control data.

In some embodiments, a path between the mesh node 800 and an ingress node (or any other mesh network device) could include zero or more hops of intervening network hardware devices. In some cases, the path may include up to 12-15 hops within a mesh network of 100×100 network hardware devices deployed in the mesh network. In some embodiments, a number of network hardware devices in the mesh network is greater than fifty. The mesh network may include hundreds, thousands, and even tens of thousands of network hardware devices.

In some embodiments, the mesh node 800 includes memory to store content files, control and command data, as well as the aggregate data described herein. The memory of the first network hardware device may be volatile memory, non-volatile memory, or a combination of both. When a content file is not stored in the memory or the storage of the mesh node 800, the mesh node 800 generates and sends a request to another node in the mesh network. Intervening network hardware devices can make similar determinations to locate the content file in the mesh network. In the event that the first content file is not stored in the mesh network, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 803, 805, 807, 809 are WLAN connections that operate in a first frequency range and the N2C connections 811 are WLAN connections that operate in a second frequency range. In another embodiment, the P2P wireless connections 803, 805, 807, 809 operate at a first frequency of approximately 5.0 GHz and the N2C connections 811 operate at a second frequency of approximately 2.4 GHz.

Figure 9:
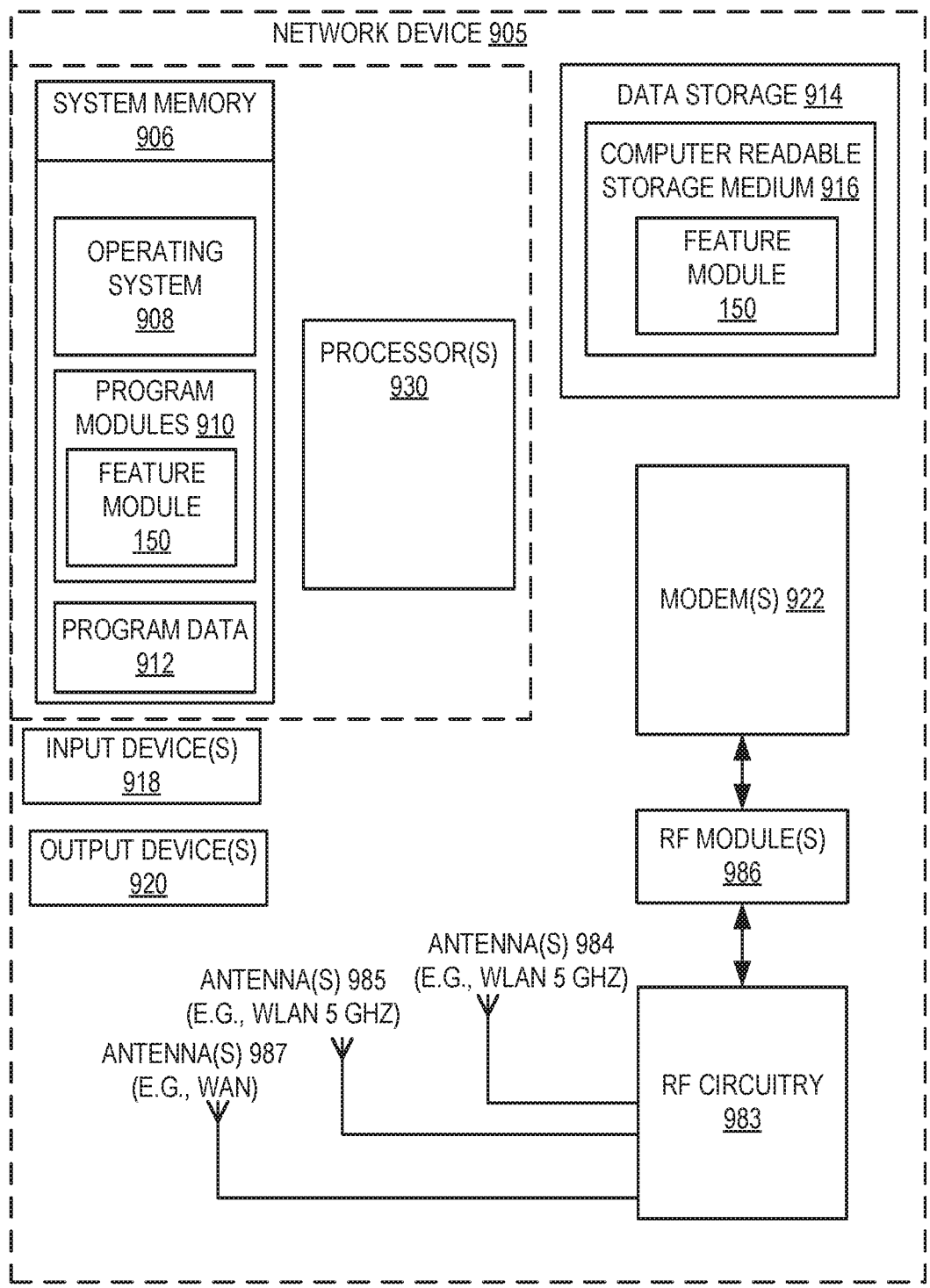
FIG. 9 is a block diagram of a network hardware device according to one embodiment.

FIG. 9 is a block diagram of a network hardware device 900 with a feature module 150 according to one embodiment. The network hardware device 900 may correspond to one of access point 110 of FIG. 1. In another embodiment, the network hardware device 900 may correspond to any of the wireless mesh point stations (MP STA) 210A-210Z, mesh access points (MAP) 220A-220K, and mesh portals (MPP) 230A-220M of FIG. 2. In another embodiment, the network hardware device 900 may correspond to the mesh node 800 of FIG. 8. Alternatively, the network hardware device 900 may be other electronic devices, as described herein.

The network hardware device 900 includes one or more processor(s) 930, such as one or more CPUs, microcontrollers, field programmable gate arrays, or other types of processors. The network hardware device 900 also includes system memory 906, which may correspond to any combination of volatile and/or non-volatile storage mechanisms. The system memory 906 stores information that provides operating system component 908, various program modules 910, program data 912, and/or other components. The program modules 910 may include instructions of the feature module 150. In one embodiment, the system memory 906 stores instructions of methods to control operation of the network hardware device 900. The network hardware device 900 performs functions by using the processor(s) 930 to execute instructions provided by the system memory 906.

The network hardware device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the network hardware device 900, the system memory 906 and the processor(s) 930 also constituting computer-readable media. The network hardware device 900 may also include one or more input devices 918 (keyboard, mouse device, specialized selection keys, etc.) and one or more output devices 920 (displays, printers, audio output mechanisms, etc.).

The network hardware device 900 further includes a modem 922 to allow the network hardware device 900 to communicate via a wireless connections (e.g., such as provided by the wireless communication system) with other computing devices, such as remote computers, an item providing system, and so forth. The modem 922 can be connected to one or more RF modules 986. The RF modules 986 may be a WLAN module, a WAN module, PAN module, GPS module, or the like. The antenna structures (antenna(s) 984, 985, and 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the network hardware device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, and 987 may be configured to transmit in different frequency bands and/or using different wireless communication protocols. The antennas 984, 985, and 987 may be directional, omnidirectional, or non-directional antennas. In addition to sending data, antennas 984, 985, and 987 may also receive data, which is sent to appropriate RF modules connected to the antennas. One of the antennas 984, 985, 987 may be any combination of the antenna structures described herein.

In one embodiment, the network hardware device 900 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the mesh network and the second wireless connection may be associated with serving a content file to a client consumption device, as described herein.

Though a modem 922 is shown to control transmission and reception via antenna (984, 985, 987), the network hardware device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An access point device comprising:
one or more processors; and
memory to store computer-executable instructions that, if executed, cause the one or more processors to:
send a wireless beacon to a plurality of client devices;
receive a first probe request message from a first client device of the plurality of client devices;
determine one or more wireless communication protocols supported by the first client device from information obtained from the probe request message;
determine a first category of the first client device, the first category indicating that at least one feature is to be disabled when the first client device is associated with the access point device;
determine that the first category is incompatible with a certain feature offered by the access point device;
send a first probe response message to the first client device omitting an indication of the certain feature, while the certain feature remains enabled for at least one other client device of the plurality of client devices; and
send, to a second access point device in the network, an indication that the first client device is incompatible with the certain feature, the indication to cause the second access point device to send, responsive to a probe request message received from the first client device, a probe response message to the first client device omitting an indication of the certain feature.

2. The access point device of claim 1, wherein the instructions further cause the one or more processors to:
receive an association request from the first client device; and
establish an association of the first client device with the access point device, wherein the certain feature is disabled for the first client device.

3. The access point device of claim 1, wherein to determine the category of the first client device, the instructions further cause the one or more processors to:
- determine a media access control (MAC) address of the first client device from the information obtained from the probe request message; and
- determine that a log of previous associations with the access point device comprises an indication that the MAC address of the first client device previously failed to associate with the access point device.

4. The access point device of claim 1, wherein to determine the category of the first client device, the instructions further cause the one or more processors to:
- determine that the first client device does not support any other wireless communication protocols besides at least one of IEEE 802.11, 802.11a, 802.11b, or 802.11g.

5. The access point device of claim 1, wherein the certain feature comprises a Fast Basic Service Set (BSS) Transition feature.

6. The access point device of claim 1, wherein the first client device associates with the second access point device without enabling the certain feature.

7. The access point device of claim 1, wherein the instructions further cause the one or more processors to:
- receive a second probe request message from a second client device of the plurality of client devices;
- determine, at least partially using information obtained from the second probe request message and using other information not present in the second probe request message, a second category of the second device;
- determine that the second category is compatible with the certain feature offered by the access point device; and
- send a probe response message to the second client device indicating that the certain feature is enabled for the second client device, while the certain feature remains disabled for the first client device.

8. A method comprising:
- sending a wireless beacon to a plurality of client devices;
- receive a first probe request message from a first client device of the plurality of client devices;
- determining one or more wireless communication protocols supported by the first client device from information obtained from the probe request message;
- determining a first category of the first client device, the first category indicating that at least one feature is to be disabled when the first client device is associated with the access point device;
- determining that the first category is incompatible with a certain feature offered by the access point device;
- sending a first probe response message to the first client device omitting an indication of the certain feature, while the certain feature remains enabled for at least one other client device of the plurality of client devices; and
- sending, to a second access point device in the network, an indication that the first client device is incompatible with the certain feature, the indication to cause the second access point device to send, responsive to a probe request message received from the first client device, a probe response message to the first client device omitting an indication of the certain feature.

9. The method of claim 8, further comprising:
- receiving an association request from the first client device; and
- establishing an association of the first client device with the access point device, wherein the certain feature is disabled for the first client device.

10. The method of claim 8, further comprising:
- determining a media access control (MAC) address of the first client device from the information obtained from the probe request message; and
- determining that a log of previous associations with the access point device comprises an indication that the MAC address of the first client device previously failed to associate with the access point device.

11. The method of claim 8, further comprising:
- determining that the first client device does not support any other wireless communication protocols besides at least one of IEEE 802.11, 802.11a, 802.11b, or 802.11g.

12. The method of claim 8, wherein the certain feature comprises a Fast Basic Service Set (BSS) Transition feature.

13. The method of claim 8, wherein the first client device associates with the second access point device without enabling the certain feature.

14. The method of claim 8, further comprising:
- receiving a second probe request message from a second client device of the plurality of client devices;
- determining, at least partially using information obtained from the second probe request message and using other information not present in the second probe request message, a second category of the second device;
- determining that the second category is compatible with the certain feature offered by the access point device; and
- sending a probe response message to the second client device indicating that the certain feature is enabled for the second client device, while the certain feature remains disabled for the first client device.

* * * * *